(No Model.)
A. G. DORSEY.
DEVICE FOR HEATING WATER.
No. 593,047. Patented Nov. 2, 1897.
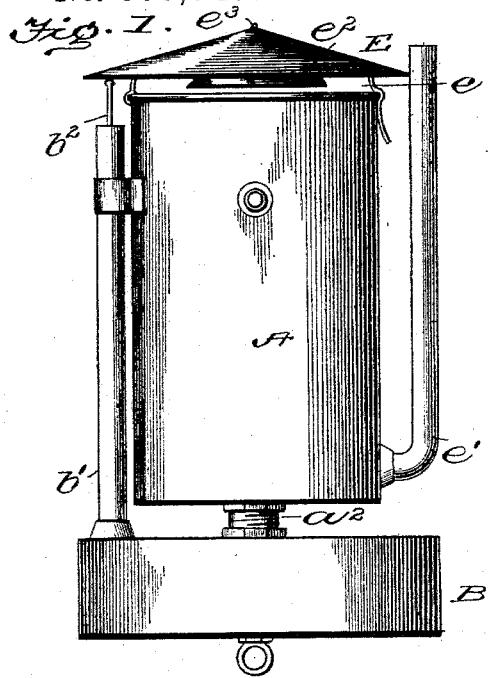
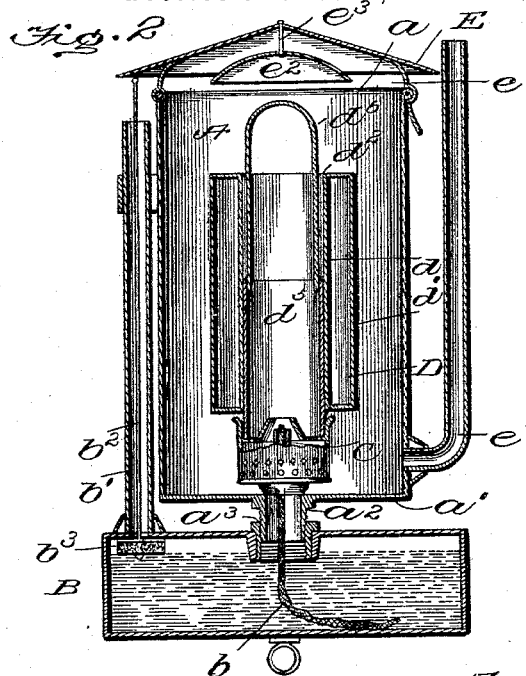
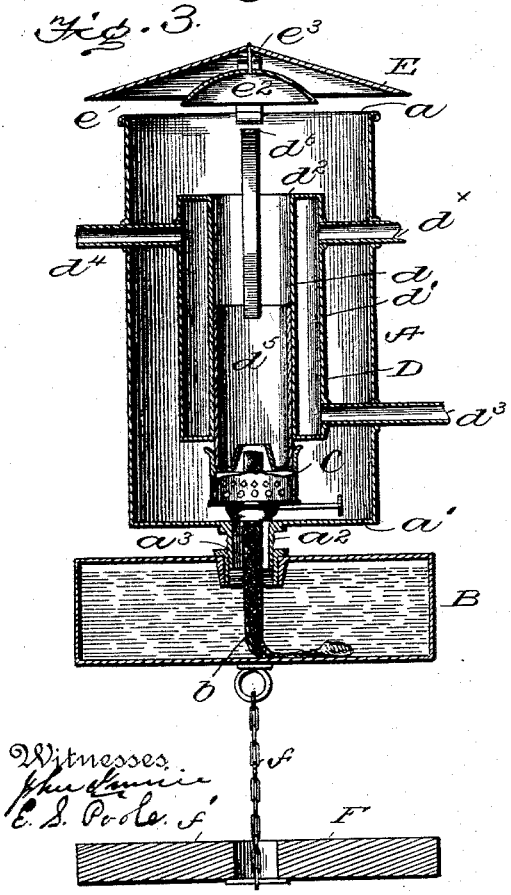
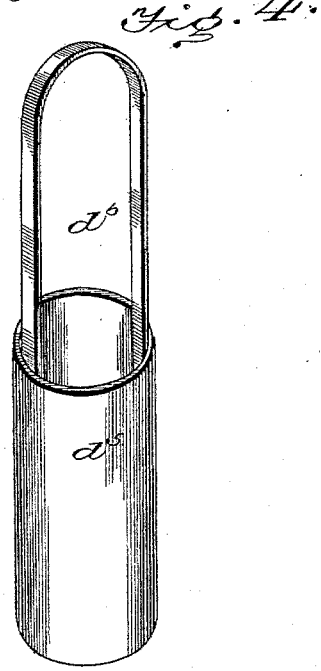
Witnesses
Inventor
Albert G. Dorsey

UNITED STATES PATENT OFFICE.

ALBERT G. DORSEY, OF CLIFTY, INDIANA.

DEVICE FOR HEATING WATER.

SPECIFICATION forming part of Letters Patent No. 593,047, dated November 2, 1897.

Application filed April 6, 1897. Serial No. 630,920. (No model.)

*To all whom it may concern:*

Be it known that I, ALBERT G. DORSEY, a citizen of the United States, residing at Clifty, in the county of Decatur and State of Indiana, have invented certain new and useful Improvements in Devices for Heating Water; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention contemplates certain new and useful improvements in devices for heating water, whereby the latter is maintained at a temperature above freezing-point.

Stock-raisers experience great difficulty in cold weather in watering their stock because of the frequent freezing of the water contained in the stock-watering tanks; and it is the principal object of my invention to overcome this annoyance by producing a device through which the water will be caused to circulate and maintained at a uniform degree of temperature above freezing-point.

The invention will be hereinafter fully set forth, and particularly pointed out in the claims.

In the accompanying drawings, Figure 1 is a view in side elevation, illustrating my invention. Fig. 2 is a longitudinal sectional view thereof. Fig. 3 is a similar view taken at right angles to Fig. 2. Fig. 4 is a detail.

Referring to the drawings, A designates a cylindrical casing open at its top $a$ and closed at its bottom $a'$, said bottom having a hole or opening therein, from which extends a threaded nipple $a^2$, which is designed to engage a threaded opening $a^3$ in the top of an oil-reservoir B, which latter is also of cylindrical shape. A wick $b$ extends down from a burner C in said casing through nipple $a^2$ into the interior of reservoir B. A pipe $b'$, having one end in communication with the interior of said oil-reservoir, is secured to the outside of casing A, a rod or wire $b^2$ being extended therethrough and connected to a float $b^3$, located within said oil-reservoir, the depth of the oil in the latter being indicated by the distance said rod or wire extends through the top of tube or pipe $b'$. Oil is supplied to said reservoir through said pipe.

D is the water-heating drum or header, the same being located within casing A and resting just above burner C. Said drum or head consists of a cylindrical chamber having inner and outer walls $d$ $d'$, the latter forming a cylindrical chamber or flue $d^2$ for the products of combustion from said burner. The inlet-pipe $d^3$ extends through the walls of casing A and enters the drum or header D near the lower end thereof, the outlet-pipe $d^4$ leading from near the upper end of said drum or header and also projected through the casing A. By this means the water entering the drum or header at its lower end becomes heated and rises, passing out through the outlet-pipe, thereby maintaining a constant circulation.

While I have illustrated the inlet and outlet pipes as being on opposite sides of the drum or header, yet it is obvious that they may be placed on the same side, as at $d^\times$, without departing from the spirit of my invention. A cylindrical member $d^5$, having an elongated handle $d^6$, whereby the same can be readily manipulated, is adapted to fit within chamber or flue $d^2$ close down over the burner C. By this means a direct draft is obtained.

The casing A is provided with a top or cover E, hinged thereto, a space $e$ being formed between the same to allow the exit of the products of combustion and heated air, fresh air being supplied to the burner C through an air-flue $e'$, leading into the lower portion of said casing. A reflector $e^2$ is secured to a rod or wire $e^3$, projected through the cover E, said reflector being designed to reflect the heat from said lamp back toward the drum or header D.

In practice my improved heating device is usually placed within the tank or trough containing the water designed to be supplied to cattle or the like, the same floating on said water and being maintained in a perpendicular position by means of a weight F, corresponding in shape to the reservoir B and connected thereto by a cord or chain $f$, said weight having a flat upper surface $f'$, whereby said reservoir will rest thereon in the event of the tank or trough becoming empty. The water will then enter the inlet-pipe $d^3$, become heated in the drum or header D, and pass out through outlet-pipe $d^4$ into the tank, thereby maintaining the temperature of the water in the latter above freezing-point.

The advantages of my invention are at once apparent to those skilled in the art to which it appertains. It will be specially observed that by placing the inlet and outlet pipes on the same side of the drum or header the heating device may be connected to a barrel or the like from the outside and keep the contents thereof at the desired temperature, in which event natural gas or the like may be used in lieu of the lamp, as described. If desired, in lieu of attaching the oil-reservoir to the bottom of casing A the same may be located within the latter without departing from the spirit of my invention. Said casing may also be provided with external ears to fit over cross-bars supported by the tank, in which event the weight F is dispensed with.

I claim as my invention—

1. The herein-described device for heating water, comprising a casing, a drum or header therein forming an inner flue, inlet and outlet pipes connected to said drum or header, a burner located in said flue, and a cylindrical member adapted to fit within said flue and surround said burner, substantially as set forth.

2. The herein-described device for heating water, comprising a casing, a burner in the bottom of the casing, a cylindrical drum or header mounted within said casing a short distance above the burner and presenting a flue, inlet and outlet pipes communicating with the drum or header, and a cylindrical member having a looped handle extending upward therefrom, said member being adapted to connect the flue directly with the burner, substantially as shown and for the purpose set forth.

In testimony whereof I affix my signature in presence of two witnesses.

ALBERT G. DORSEY.

Witnesses:
JOHN G. WILSON,
MERITT DORSEY.